(12) United States Patent
Calic

(10) Patent No.: US 11,159,002 B2
(45) Date of Patent: Oct. 26, 2021

(54) METHOD FOR REMOVING INSULATION FROM INNER CONDUCTORS OF A CABLE, AND STRIPPING DEVICE

(71) Applicant: Komax Holding AG, Dierikon (CH)

(72) Inventor: Zoran Calic, Kriens (CH)

(73) Assignee: KOMAX HOLDING AG, Dierikon (CH)

( * ) Notice: Subject to any disclaimer, the term of this patent is extended or adjusted under 35 U.S.C. 154(b) by 0 days.

(21) Appl. No.: 16/860,407

(22) Filed: Apr. 28, 2020

(65) Prior Publication Data

US 2020/0366070 A1 Nov. 19, 2020

(30) Foreign Application Priority Data

May 16, 2019 (EP) ..................................... 19174911

(51) Int. Cl.
  *H02G 1/12* (2006.01)
(52) U.S. Cl.
  CPC ................................ *H02G 1/1256* (2013.01)
(58) Field of Classification Search
  CPC ... Y10T 83/0267; Y10T 83/04; H02G 1/1256; H02G 1/12; H02G 1/1202; H02G 1/1248; H02G 1/1251; H02G 1/1253; H02G 1/1273
  USPC ................................ 81/9.4, 9.51, 9.41, 9.42
  See application file for complete search history.

(56) References Cited

U.S. PATENT DOCUMENTS

| | | | | |
|---|---|---|---|---|
| 3,895,426 A | * | 7/1975 | Papsdorf | H02G 1/1256 29/867 |
| 5,445,051 A | * | 8/1995 | Carpenter | H02G 1/1256 81/9.51 |
| 5,456,148 A | * | 10/1995 | Hoffa | H02G 1/1256 198/626.4 |
| 5,479,701 A | * | 1/1996 | Yamano | H02G 1/1256 29/426.4 |
| 5,934,161 A | * | 8/1999 | Keene | H02G 1/1256 29/564.4 |
| 6,658,719 B2 | | 12/2003 | Thoms et al. | |

(Continued)

FOREIGN PATENT DOCUMENTS

| | | |
|---|---|---|
| DE | 102016003958 A1 | 10/2016 |
| EP | 0001678 A1 | 6/1979 |

(Continued)

*Primary Examiner* — Phong H Nguyen
(74) *Attorney, Agent, or Firm* — William J. Clemens; Shumaker, Loop & Kendrick, LLP

(57) ABSTRACT

A method for removing insulation from inner conductors of a cable having a first section with a cable sheath removed and a second section with the cable sheath not removed utilizes a stripping device to perform the following steps: inserting the first section between a first rotatable roller and a second rotatable roller of the stripping device; moving the first roller and/or the second roller toward each other to clamp the first section between the rollers; moving the cable in a first direction that moves the second section away from the rollers; moving the cable in a second direction opposite the first direction that moves the second section toward the rollers; moving stripping blades toward the first section to cut into the insulation of the inner conductors; and moving the cable in the first direction to remove at least part of the insulation from the inner conductors.

15 Claims, 10 Drawing Sheets

(56) References Cited

U.S. PATENT DOCUMENTS 6,766,724 B2 * 7/2004 Bernardelle ......... H02G 1/1256
29/33 F

FOREIGN PATENT DOCUMENTS

EP          1231692 A1    8/2002
WO       9952188 A1   10/1999

* cited by examiner

METHOD FOR REMOVING INSULATION FROM INNER CONDUCTORS OF A CABLE, AND STRIPPING DEVICE

FIELD

The present invention relates to a method for removing insulation from the inner conductors of a cable and to a stripping device.

BACKGROUND

Multicore cables or sheathed cables have a plurality of individually insulated inner conductors that are surrounded by a sheath. The sheath has at least one outer insulation layer and may include additional layers such as shielding fabric or foils. The individual inner conductors consist of twisted strands (usually made of copper or aluminum), which are surrounded by an insulation (e.g. plastic insulation). The inner conductors can also be twisted.

In order to enable automatic processing of multicore cables, it is useful to align the inner conductors after removing the cable sheath so that they lie next to each other in a row. With this, the requirement is given that the inner conductors can be stripped with a special pair of blades.

A disadvantage of previously known methods or previously known stripping devices is that problems can occur if the inner conductors are to be aligned next to each other in a row, but the inner conductors are not twisted or are twisted in the same direction in which a movement for stripping by the stripping device takes place. In addition, in the case of prior art stripping devices, it is disadvantageous that the insulation can be deformed and/or the inner conductors can be deformed when aligning the inner conductors.

Among other things, there may be a need for a method or a stripping device by means of which the insulation can be removed from the inner conductors of a multicore cable in a technically simple and reliable manner.

SUMMARY

Such a need may be satisfied by a method for removing insulation from the inner conductors of a cable and a stripping device according to the following description.

According to a first aspect of the invention, a method for removing insulation from inner conductors of a cable by means of a stripping device is proposed, the method comprising the following steps: providing the cable with a plurality of inner conductors, wherein in a first section of the cable, the cable sheath is removed and in a second section of the cable, the cable sheath is not removed; inserting the first section of the cable between a first rotatable roller and a second rotatable roller of the stripping device; moving the first roller and/or the second roller in such a manner that the first roller and the second roller move towards each other for clamping the first section of the cable between the rollers; moving the cable in a first direction in such a manner that the second section of the cable moves away from the rollers while the first section is clamped between the rollers; moving the cable in a second direction in such a manner that the second section of the cable is moved closer to the rollers, wherein the first direction is opposite to the second direction, while the first section is clamped between the rollers; moving stripping blades towards the first section of the cable in such a manner that the stripping blades cut into the insulation of the inner conductors; and moving the cable in the first direction to remove at least part of the insulation from the inner conductors. The steps of the method can be performed in particular in the order indicated.

The advantage of this method is that in this way, the inner conductors of a multicore cable can be stripped in a technically simple manner. This means that the insulation of the inner conductors can be removed in a technically simple manner. In particular, it reliably prevents the insulation or the inner conductors from deforming when aligning the inner conductors in one plane, even if the inner conductors of the cable are not twisted. Moreover, this makes it possible to strip the inner conductors of cables of which the cable sheath of the cable is removed only in a small section of the cable.

According to a second aspect of the invention, a stripping device for removing insulation from inner conductors of a cable is proposed, wherein in a first section of the cable, the cable sheath of the cable is removed and in a second section of the cable, the cable sheath of the cable is not removed, wherein the stripping device comprises: a first rotatable roller and a second rotatable roller, wherein the rollers are designed to clamp the first section of the cable between the first roller and the second roller; a moving device for moving the cable in a first direction and in a second direction opposite to the first direction while the first section is clamped between the rollers, wherein during the movement of the cable in the first direction, the second section of the cable moves away from the rollers and during the movement of the cable in the second direction, the second section of the cable is moved closer to the rollers; and stripping blades for removing the insulation of the inner conductors of the cable, wherein the stripping blades are designed and can be arranged in such a manner that the stripping blades cut into the insulation of the inner conductors and the insulation is removed from the inner conductors when the cable moves in the first direction.

An advantage of this is that a multicore cable, i.e. a cable with a plurality of inner conductors, can be stripped by means of the stripping device in a technically simple and reliable manner. This means that the insulation of the inner conductors can be removed in a technically simple manner. In addition, the stripping device reliably prevents the insulation and/or the inner conductors from being deformed when aligning the inner conductors in one plane, even if the inner conductors are not twisted. Moreover, the insulation can be removed from inner conductors by means of the stripping device, even if the section where the cable sheath is removed from the cable is particularly short or small. In addition, the stripping device is designed to be cost-effective.

Possible features and advantages of embodiments of the invention may, inter alia, and without limiting the invention, be considered as being based on ideas and findings described below.

According to an embodiment of the invention, the pressure of the rollers on the first section of the cable is increased after the cable has been moved in the first direction and before the cable is moved in the second direction. The advantage of this is that the alignment of the inner conductors next to each other in a row or in one plane is achieved even more reliably or quickly. Especially when the inner conductors are twisted together very strongly, the alignment of the inner conductors next to each other in a row or plane can be achieved in a particularly reliable manner.

According to an embodiment of the method, the stripping blades and cutting blades for cutting the cable are parts of a cutter head, the method further comprising the following step: moving the cutter head in a direction perpendicular to the first direction for arranging the first section of the cable between the stripping blades. The advantage of this is that the stripping blades and the cutting blades can be used independently of each other. This increases the variability of the method.

According to an embodiment of the method, the rollers are each moved only along one direction of movement when clamping the first section of the cable between the rollers, wherein the two directions of movement of the rollers are exactly opposite to each other. The advantage of this is that the rollers do not carry out any movement transverse to each other or movement offset to each other, but only a linear movement in two directions opposite to each other, thus, towards or away from each other, so to speak. This ensures that the inner conductors, even if they are not twisted, are securely aligned next to each other in a row or in one plane. In particular, this reliably prevents deformation of the insulation of the inner conductors or the inner conductors.

According to an embodiment of the method, the pressure of the rollers on the first section of the cable during clamping is a function of the distance between the two rollers. An advantage of this is that the method can be carried out with a technically particularly simple stripping device. In addition, the method is particularly reliable.

According to an embodiment of the method, the pressure with which the rollers clamp the first section is adjusted independently of the distance between the rollers, in particular pneumatically. The advantage of this is that the inner conductors are moved or brought into one plane in a particularly reliable manner. In addition, the insulation of the inner conductors can be removed from the inner conductors even more precisely.

According to an embodiment of the invention, the cable is moved multiple times alternately in the first direction and the second direction, while the first section is clamped between the rollers. One advantage of this is that it is ensured in a technically simple and particularly reliable manner that the inner conductors of the cable are arranged in one plane before the insulation of the inner conductors is removed.

According to an embodiment of the method, the cable is moved alternately in the first direction and the second direction until the inner conductors of the cable are arranged in one plane. The advantage here is that it is ensured that the inner conductors are actually arranged in one plane before cutting into the insulation. Thus, removing the insulation is ensured in a particularly reliable manner.

According to an embodiment of the stripping device, the stripping device further comprises a cutter head, wherein the cutter head includes the stripping blades and cutting blades, wherein the cutter head can be moved in a direction perpendicular to the first direction in such a manner that the first section of the cable extends between the stripping blades. An advantage of this is that in the stripping device, the stripping blades and the cutting blades can be used independently of each other. This increases the variability of the stripping device.

According to an embodiment of the stripping device, the stripping device is designed in such a manner that during clamping of the first section of the cable between the rollers, each of the rollers can only be moved along one direction of movement, wherein the two directions of movement of the rollers are exactly opposite to each other. An advantage of this is that in the stripping device, the rollers cannot carry out a transverse movement, i.e. a movement offset to one another, but the rollers can only move towards one another and away from one another along one direction of movement. This ensures that even in the case of a cable with inner conductors that are not twisted together, the inner conductors can be aligned in one plane without the occurrence of deformation of the inner conductors and/or the insulation.

According to an embodiment of the stripping device, the stripping device is designed in such a manner that the pressure of the rollers can be increased on the first section of the cable while the first section of the cable is clamped between the rollers, wherein the pressure with which the rollers clamp the first section is a function of the distance between the rollers. The advantage here is that the stripping device can be designed in a technically particularly simple and cost-effective manner.

According to an embodiment of the stripping device, the stripping device is designed in such a manner that the pressure of the rollers on the first section of the cable can be increased, in particular pneumatically, while the first section of the cable is clamped between the rollers, without significantly changing the distance between the rollers. An advantage of this is that the stripping device can align the inner conductors in one plane in a particularly reliable manner. Moreover, the insulation of the inner conductors can be removed by means the stripping device in an even more reliable manner.

According to an embodiment of the stripping device, the stripping device is designed in such a manner that the cable can be moved several times alternately in the first direction and the second direction, while the first section is clamped between the rollers. The advantage of this is that by means of the stripping device, the inner conductors of the cable can be arranged next to each other or in one plane in a reliable and technically simple manner before the insulation of the inner conductors is removed.

According to an embodiment of the stripping device, the stripping device is designed in such a manner that the cable can be moved alternately in the first direction and the second direction until the inner conductors of the cable are arranged in one plane. The advantage here is that the stripping device does not stop the movement of the cable in the first direction or the second direction until the inner conductors are actually aligned or arranged in one plane. Thus, it is ensured that the subsequent cutting into the insulation and removal of the insulation from the inner conductors can be carried out successfully and with precision.

It should be noted that some of the possible features and advantages of the invention are described herein with reference to different embodiments. A person skilled in the art recognizes that the features can be combined, adapted or exchanged in an appropriate manner to arrive at further embodiments of the invention.

In the following, embodiments of the invention are described with reference to the attached drawings, wherein neither the drawings nor the description are to be interpreted as limiting the invention.

DESCRIPTION OF THE DRAWINGS

The above, as well as other advantages of the present invention, will become readily apparent to those skilled in the art from the following detailed description of a preferred embodiment when considered in the light of the accompanying drawings in which.

The figures are merely schematic and not true to scale. Identical reference signs in the different figures indicate features that are identical or have the same effect.

DETAILED DESCRIPTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
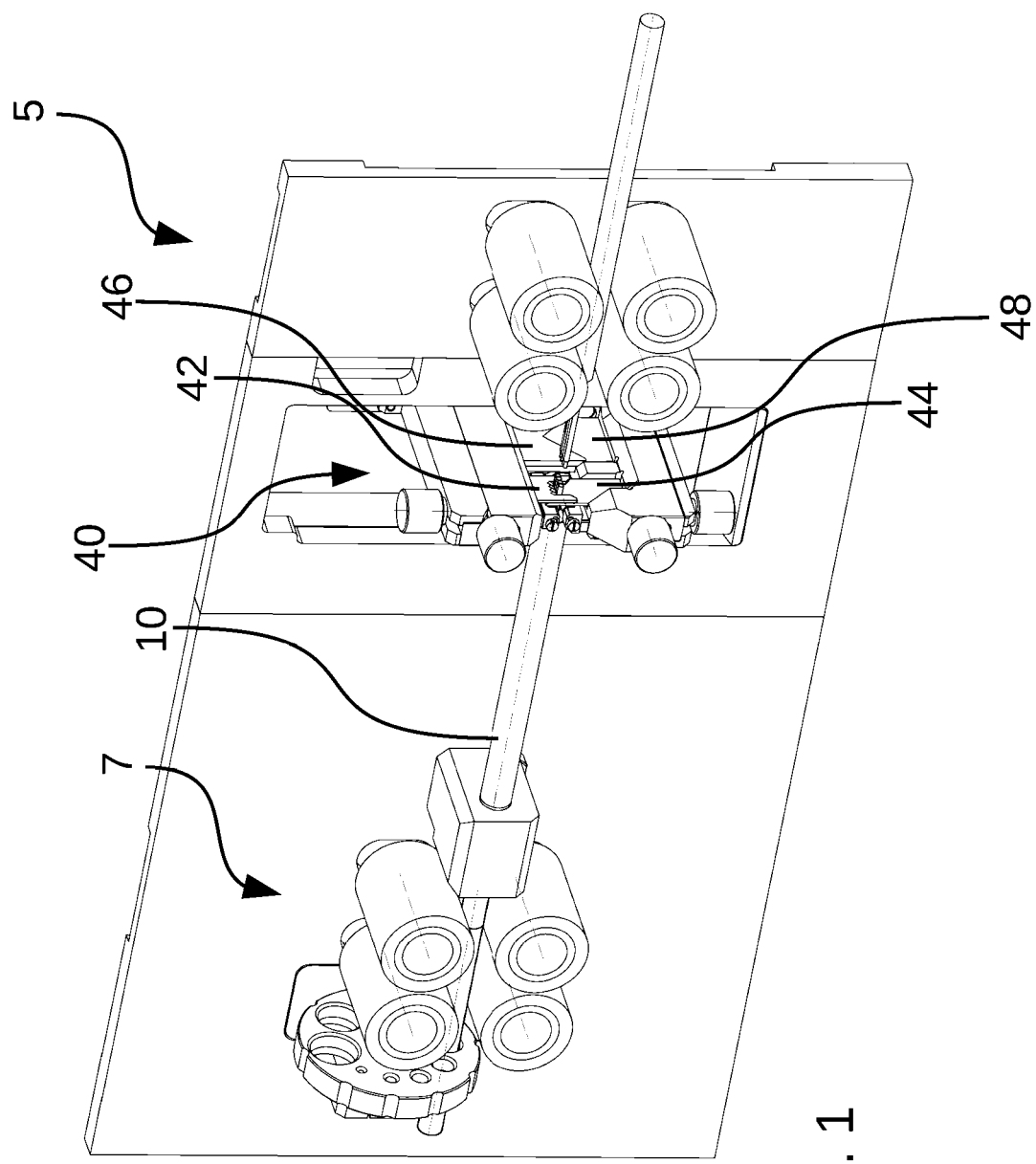
FIG. 1 shows a perspective view of an embodiment of the stripping device according to the invention.
Figure 2:
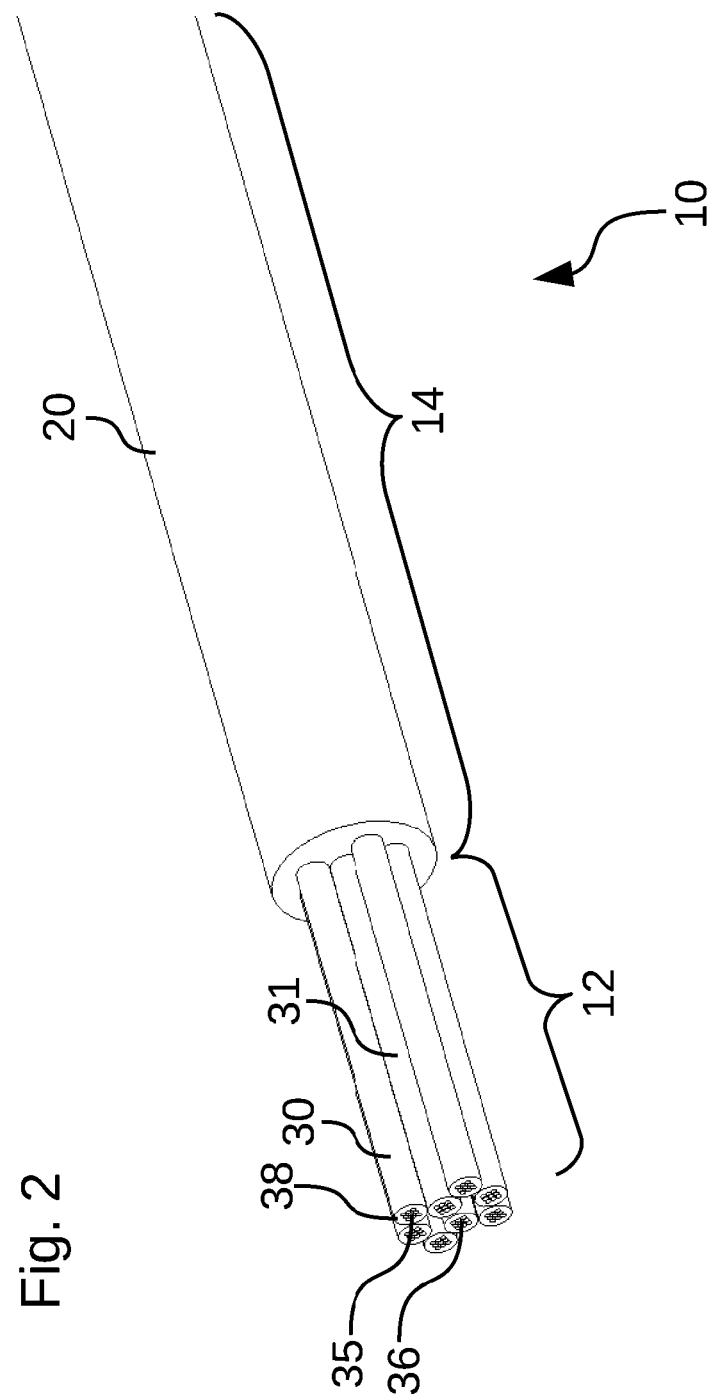
FIG. 2 shows a perspective view of a cable with a plurality of inner conductors of which the cable sheath is removed in a first section.
Figure 3:
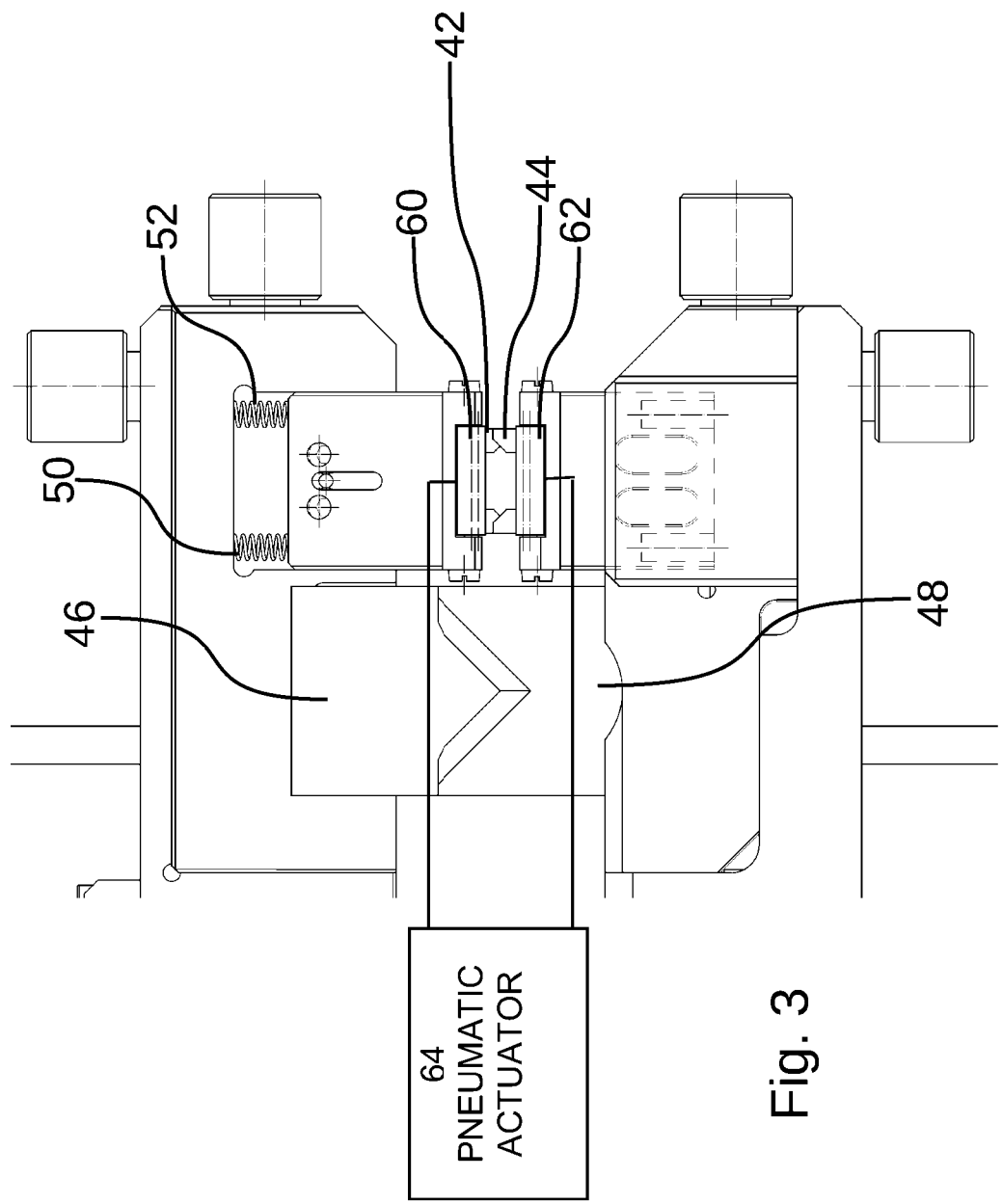
FIG. 3 shows a frontal view of the blade block of the stripping device of FIG. 1.

FIG. 1 shows a perspective view of an embodiment of the stripping device 5 according to the invention. FIG. 2 shows a perspective view of a cable 10 with a plurality of inner conductors 30, 31, of which the cable sheath 20 is removed in a first section 12. FIG. 3 shows a frontal view of the blade block of the stripping device 5 of FIG. 1.

In FIG. 3, so to speak, the blade block is viewed from the left side of FIG. 1.

The stripping device 5 is designed for removing the insulation 38 from a plurality of inner conductors 30, 31 of a cable 10. The cable 10 usually comprises a cable sheath 20, which typically has one or more outer insulation layers. The cable sheath 20 may contain additional layers, such as shielding fabric or foils.

Figure 4:
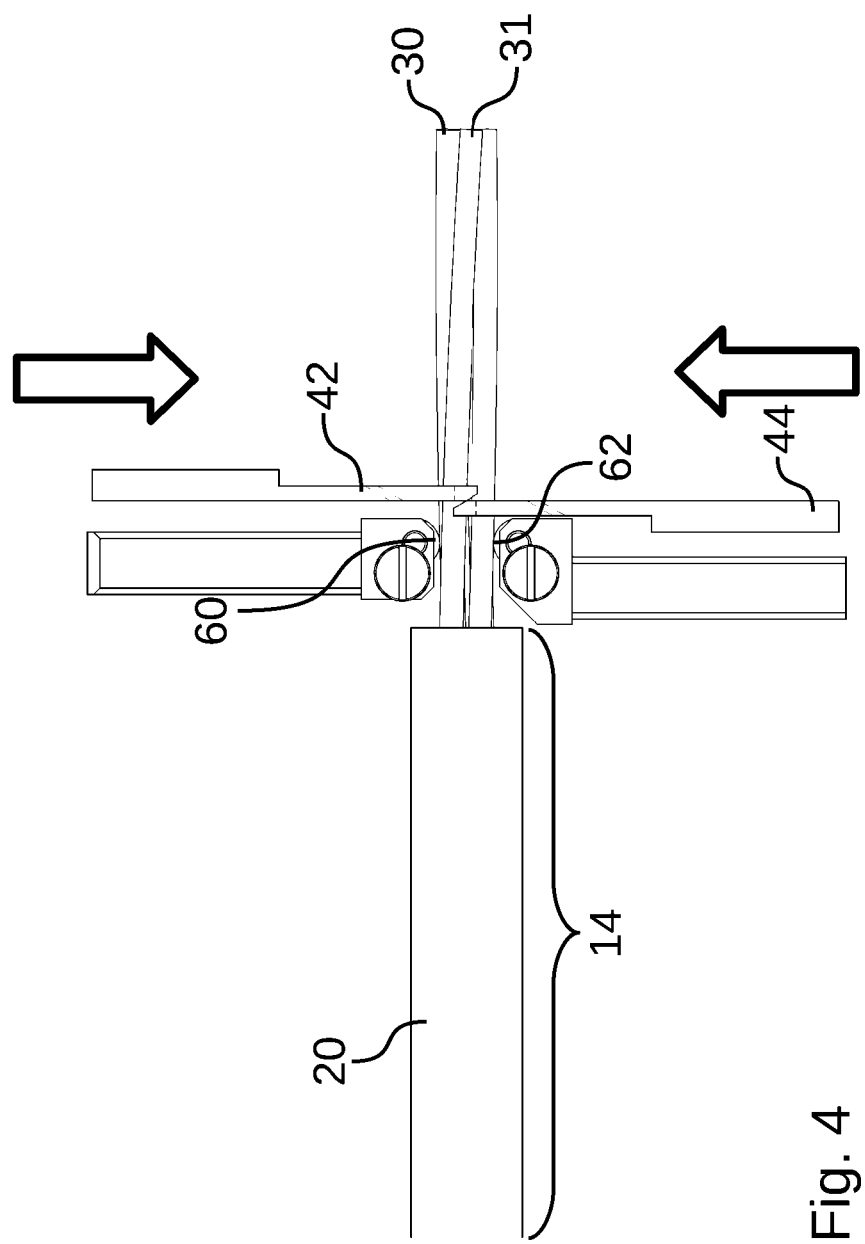
FIG. 4 shows a side view of the stripping device of FIG. 1 during the first method step.

The cable 10 has a plurality of inner conductors 30, 31 or cores. This means that cable 10 is a multicore cable. The inner conductors 30, 31 can be twisted together as illustrated in FIG. 4. However, it is also possible that the inner conductors 30, 31 or cores of the cable 10 run parallel to each other, as illustrated in FIG. 2. This means that it is possible that the inner conductors 30, 31 are not twisted together.

The inner conductors 30, 31, in turn, may have a plurality of strands 35, 36. The plurality of strands 35, 36 may be twisted together. It is also possible that the strands 35, 36 are not twisted together.

In the case of cable 10, the cable sheath 20 was removed in a first section 12 of the cable 10, so that the inner conductors 30, 31, which each have insulation 38, are exposed. In FIG. 2 the first section 12 of cable 10 is located on the left. In a second section 14 of cable 10, the cable sheath 20 is still present. In FIG. 2, the second section 14 of cable 10 is located on the right.

The cable sheath 20 may have been removed in the first section 12 of cable 10 by means of the stripping device. It is also possible that the cable sheath 20 was removed manually or with another device in the first section 12 of cable 10.

The stripping device 5 has a blade block comprising an upper cutting blade 46, a lower cutting blade 48, an upper stripping blade 42 and a lower stripping blade 44 as shown in FIG. 1. The two stripping blades 42, 44 each have external projections, so that when the stripping blades 42, 44 are closing, a rectangle is formed in a plane perpendicular to the longitudinal axis of the cable 10. The longitudinal axis of the cable 10 extends into and out of the drawing plane in FIG. 3. The cable 10 extends through this rectangle when the stripping blades 42, 44 are used.

The cutting blades 46, 48 are each V-shaped, so that when the cutting blades 46, 48 are closing, an opening formed by parts of the cutting blades 46, 48 is created in a plane perpendicular to the longitudinal axis of the cable 10. The cable 10 extends through these openings when the cutting blades 46, 48 are used.

The cutting blades 46, 48 are designed for severing or cutting through the cable 10 or the inner conductors 30, 31. However, it would also be conceivable to use the cutting blades 46, 48 to cut into the cable sheath 20 and use the cutting blades to remove the sheath.

The stripping blades 42, 44 each have a plurality of projections and recesses. This means that the stripping blades 42, 44 each have a zigzag shape on their cutting edge facing the cable 10. The projections and recesses of the upper stripping blades 42, 44 can be designed to be complementary to the projections and recesses of the lower stripping blades 42, 44. The number of projections or recesses can correspond to the (maximum) number of inner conductors 30, 31, so that there is a notch or recess of the second stripping blade 42, 44 for each inner conductor 30, 31. The stripping blades 42, 44 are used to cut or cut into the insulation 38 of the inner conductors 30, 31.

The cutter head 40 can be moved in a plane perpendicular to the longitudinal direction of the cable 10 (in FIG. 3 to the left or right). This means that the cutter head 40 can be moved into such a position that when the cutter head 40 is closing, the cutting blades 46, 48 cut through the cable 10 or that when the cutter head 40 is closing, the stripping blades 42, 44 cut into the insulation 38 of the inner conductors 30, 31. Thus, the cable 10 is arranged either between the stripping blades 42, 44 or between the cutting blades 46, 48.

In the drawings, the cutter head 40 is always arranged such that the cable 10 is arranged between the stripping blades 42, 44.

The stripping device 5 has a first roller 60 or upper roller and a second roller 62 or lower roller. The rollers 60, 62 can be designed as cylinders. The rollers 60, 62 can each rotate around their horizontal axis. The rollers 60, 62 in FIG. 3 are arranged further to the right than the stripping blades 42, 44. The closing movement of the cutter head 40 moves the rollers 60, 62 towards each other. This means that when closing the cutter head 40 or moving the upper part and the lower part of the cutter head 40 towards each other, the rollers 60, 62 are also moved towards each other. The rollers 60, 62 are acted on by a plurality of compression springs 50, 52. The compression springs 50, 52 generate the clamping force on the first section 12 of the cable 10 when the cable 10 is clamped between the rollers 60, 62, wherein the clamping force is a function of the distance between the two rollers 60, 62. The further the stripping blades 42, 44 are closed, the more the rollers 60, 62 press on the first section 12 of the cable 10.

It is also conceivable that the rollers 60, 62 have a closing device that is independent of the stripping blades 42, 44. The closing device can have a pneumatic cylinder, for example. Hereby, the clamping force of the rollers 60, 62 on the first section 12 of cable 10 can be changed independently of the distance between the rollers 60, 62. As shown in FIG. 3, a pneumatic actuator 64 can be coupled to move the rollers 60, 62 independent of the stripping blades 42, 44.

The rollers 60, 62 can substantially only move upwards (away from each other) and downwards (towards each other). A lateral movement of the rollers 60, 62 is not provided.

In the following, the process flow of the method for removing the insulation 38 or insulation from inner conductors 30, 31 or cores of the cable 10 is explained.

Figure 5:
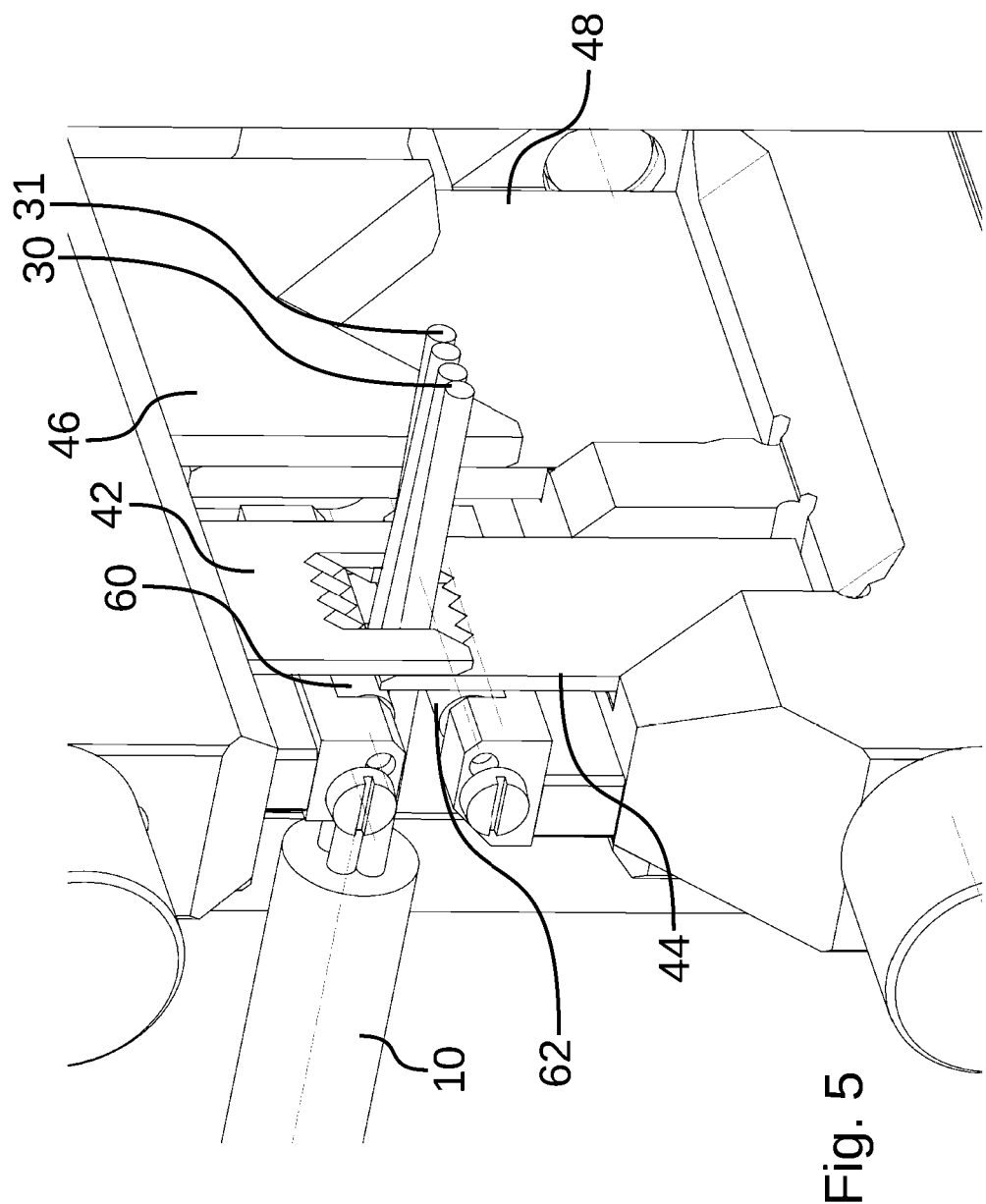
FIG. 5 shows a perspective view of the stripping device of FIG. 1 during the first method step.

FIG. 4 shows a side view of the stripping device 5 of FIG. 1 during the first method step. FIG. 5 shows a perspective view of the stripping device 5 of FIG. 1 during the first method step.

First, a cable 10 with a plurality of inner conductors 30, 31 is provided, wherein the cable sheath 20 has already been removed from the cable 10 in a first section 12 (cf. FIG. 2). The inner conductors 30, 31 can be twisted together (cf. FIG. 4) or, as shown in FIG. 2, not twisted together. In a second section 14, the cable sheath 20 is still present on cable 10.

The cable 10 is guided with its first section 12 between the stripping blades 42, 44. Then the cutter head 40 is closed far enough that the first section 12 or a section of the first section 12 of the cable 10 is clamped between the two rollers 60, 62. The rollers 60, 62 now press in opposite directions on the inner conductors 30, 31 of the cable 10. This pressing or the forces is/are shown by two arrows in FIG. 4.

In FIG. 4 the cable 10 is guided between the rollers 60, 62 so deep that the cable sheath 20 of the second section 14 almost touches the blade block.

Figure 6:
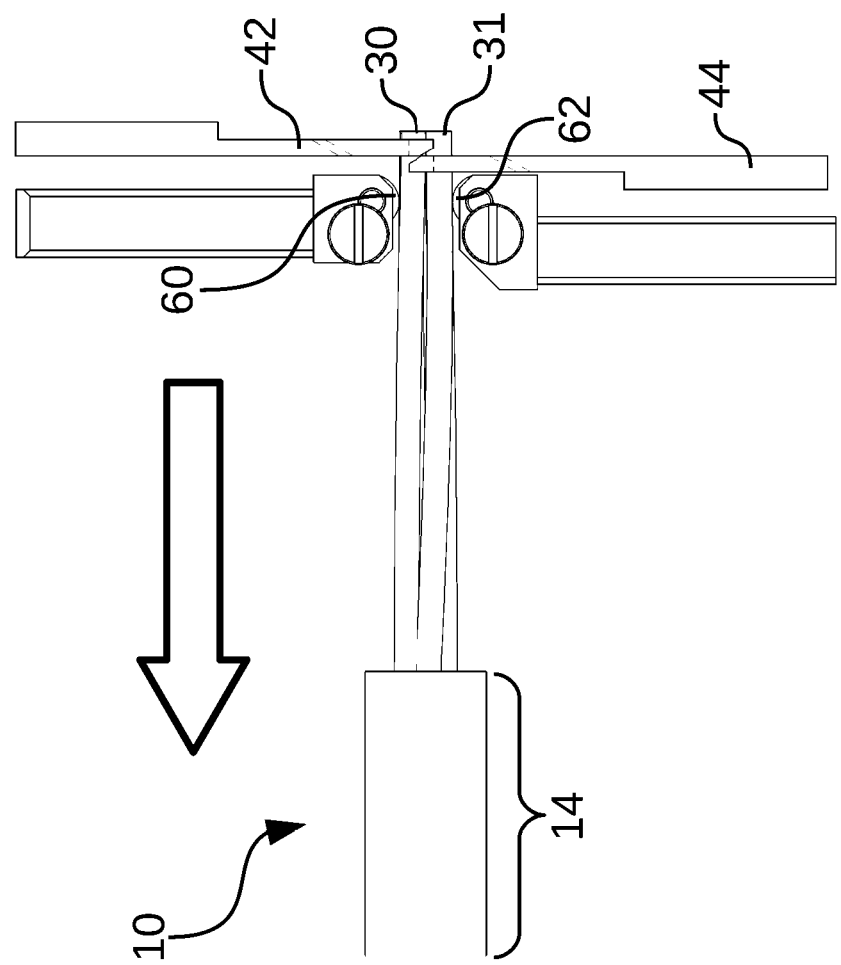
FIG. 6 shows a side view of the stripping device of FIG. 1 during the second method step.

FIG. 6 shows a side view of the stripping device 5 of FIG. 1 during or after the second method step. After clamping a region of the first section 12 of the cable 10 between the rollers 60, 62, the cable 10 is now moved along its longitudinal axis (the longitudinal axis runs from left to right or right to left in FIG. 6) in a first direction by means of a moving device 7 (e.g. a plurality of rollers as shown in FIG. 1), so that the second section 14 of the cable 10, in which the cable sheath 20 is present, is removed from the stripping blades 42, 44 or the rollers 60, 62. This movement is shown with an arrow in FIG. 6.

The cable 10 is, so to speak, moved to the left in FIG. 6 while the rollers 60, 62 keep the inner conductors 30, 31 clamped or continue to press on the inner conductors 30, 31. This is a grazing relative movement. During the movement to the left in FIG. 6, the rollers 60, 62 rotate correspondingly around their respective axis of rotation.

By pressing together or clamping the inner conductors 30, 31 between the rollers 60, 62 and simultaneously moving to the left in FIG. 6, the inner conductors 30, 31 approach an arrangement or alignment in which the inner conductors 30, 31 lie next to one another in one plane. When the inner conductors 30, 31 are twisted together, they are thereby (at least partially) untwisted.

Figure 7:
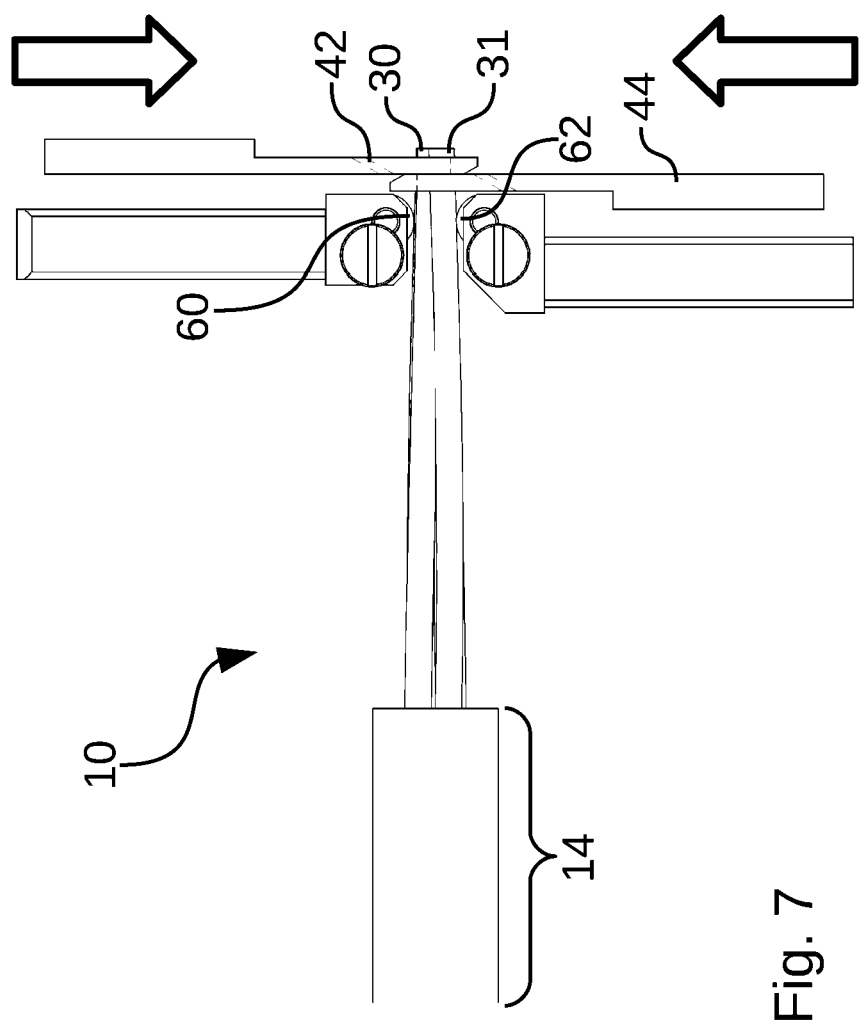
FIG. 7 shows a side view of the stripping device of FIG. 1 during the third method step.

FIG. 7 shows a side view of the stripping device 5 of FIG. 1 during the third method step. After the cable 10 has been moved in the first direction, the pressure of rollers 60, 62 is increased on the first section 12 or a portion of the first section 12 of the cable 10. This is shown in FIG. 7 by two arrows. This increasing of the pressure of rollers 60, 62 on the portion of the first section 12 of the cable 10 is optional and does not need to be carried out.

Figure 8:
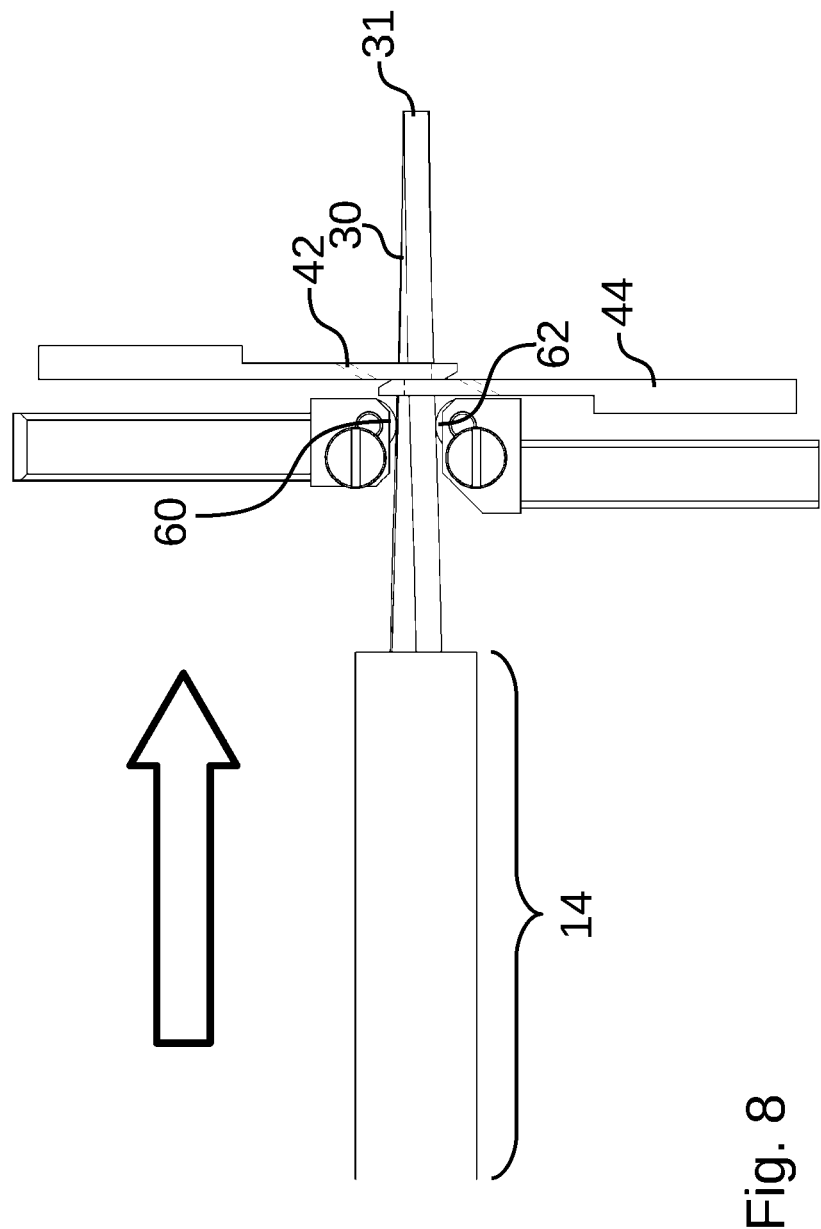
FIG. 8 shows a side view of the stripping device of FIG. 1 during the fourth method step.

FIG. 8 shows a side view of the stripping device 5 of FIG. 1 during the fourth method step. Now, the cable 10 is moved in the second direction, which is opposite to the first direction. This means that the second section 14 of cable 10 is moved towards the stripping blades 42, 44 or the rollers 60, 62. This direction of movement of cable 10 is shown by an arrow in FIG. 8. In FIG. 8, the cable 10 is moved to the right. During this movement, the rollers 60, 62 rotate around their respective axis of rotation. This prevents kinking and/or bending of the inner conductors 30, 31 and/or the insulation 38. The rollers 60, 62 continue to keep the first section 12 of cable 10 clamped between the rollers 60, 62 or press in opposite directions on the first section 12 of cable 10.

The second method step and the fourth method step (and, optionally, the third method step between the second method step and the fourth method step) can be alternately repeated, in particular repeated multiple times. This means that the cable 10 is moved alternately multiple times in the first direction and the second direction, while the cable 10 is or remains clamped between the rollers 60, 62. It is conceivable that the pressure of the rollers 60, 62 on the first section 12 is increased each time the direction of movement of cable 10 is reversed (from the first direction to the second direction and/or from the second direction to the first direction).

Now, the inner conductors 30, 31 are next to each other in a row or a plane. This means, among other things, that the inner conductors 30, 31 are untwisted as far as they were twisted together.

Figure 9:
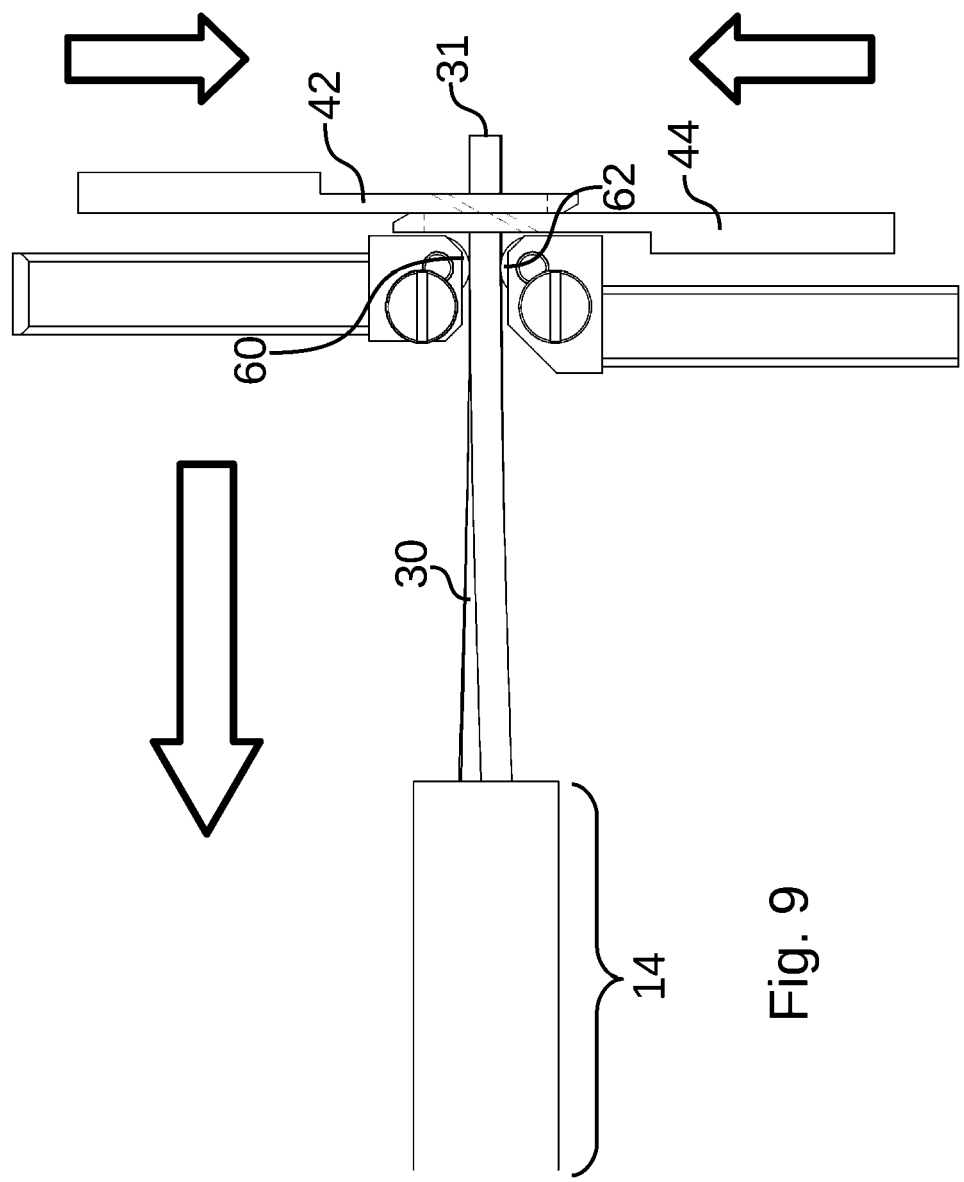
FIG. 9 shows a side view of the stripping device of FIG. 1 during the fifth method step.
Figure 10:
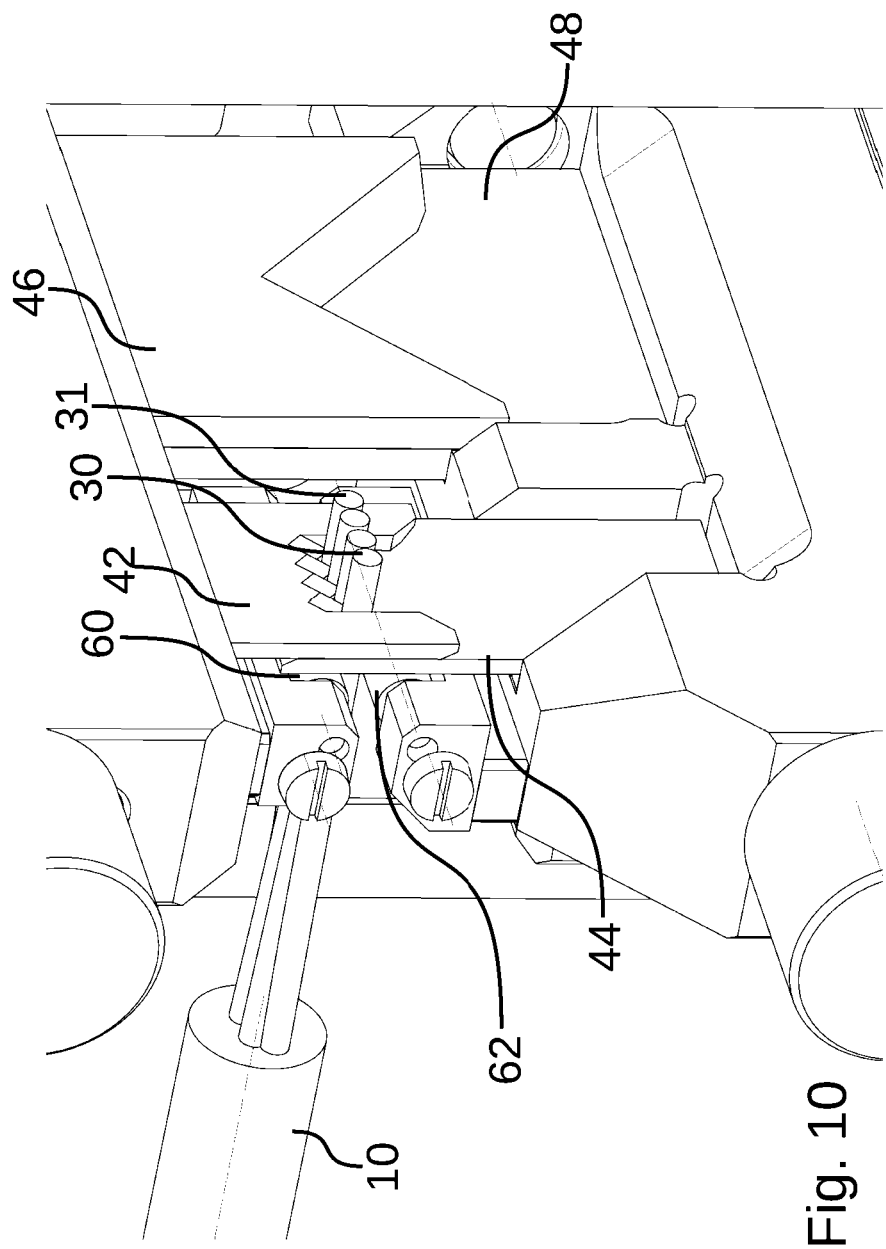
FIG. 10 shows a perspective view of the stripping device of FIG. 1 during the fifth method step.

FIG. 9 shows a side view of the stripping device 5 of FIG. 1 during the fifth method step. FIG. 10 shows a perspective view of the stripping device 5 of FIG. 1 during the fifth method step.

Finally, the cutter head 40 or the stripping blades 42, 44 are closed further than before, so that the stripping blades 42, 44 cut into the insulation 38 of the inner conductors 30, 31 at the top and bottom, respectively. This is indicated by the vertical arrows in FIG. 9.

After the stripping blades 42, 44 have cut into the insulation 38, the cable 10 is moved in the first direction, i.e. to the left in FIG. 9. This way, the insulation 38 of the inner conductors 30, 31 is removed or pulled off the inner conductors 30, 31. The insulation 38 remains, so to speak, attached to the stripping blades 42, 44. The removal of the insulation 38 or the insulation of a plurality of inner conductors 30, 31, in particular all inner conductors 30, 31 of cable 10, is carried out simultaneously.

As can be clearly seen in FIG. 10, the inner conductors 30, 31 lie next to each other in one plane when cutting into insulation 38 or when removing insulation 38.

The pressure of rollers 60, 62 on the inner conductors 30, 31 of the cable 10 can be pneumatically adjusted or changed. This means that the pressure on the inner conductors 30, 31 of the cable 10 can be changed independently of the distance between the rollers 60, 62.

The described movements of the cable 10 or the inner conductors 30, 31 are always to be understood as being relative to the blade block. This means that it is also possible that the cable 10 is not moved, but that the blade block is moved actively. However, important in each case is only the relative movement of the cable 10 with respect to the blade block or with respect to the stripping blades 42, 44 or the rollers 60, 62.

Lateral movements of the rollers 60, 62 for aligning the inner conductors 30, 31 do not typically occur. The rollers 60, 62 are only moved towards each other to increase the pressure on the first section 12 of the cable 10, or moved away from each other to decrease the pressure on the first section 12 of the cable 10.

The rollers 60, 62 are not moved relative to each other or in directions that are offset parallel to each other. The rollers 60, 62 are moved towards each other and thus the cable 10 is clamped or pressed between the rollers 60, 62. The rollers 60, 62 are not moved laterally relative to the cable 10 in order to actively untwist the inner conductors 30, 31. Therefore, it cannot happen that the rollers 60, 62 press or try to untwist the inner conductors 30, 31 in a direction that corresponds to the twisting direction of the inner conductors 30, 31, whereby the inner conductors 30, 31 are further twisted instead of being untwisted, which can lead to damage and/or deformation of the inner conductors 30, 31. By the movement of the rollers 60, 62 towards each other, the inner conductors 30, 31 are untwisted without damage or deformation of the inner conductors 30, 31, regardless of the twisting direction of the inner conductors 30, 31 and are arranged in one plane.

The force acting from the stripping device 5 on the inner conductors 30, 31 acts on the inner conductors 30, 31 from above and below, so to speak, and in exactly opposite directions to each other. The rotatable rollers 60, 62 or rotatable cylinders press towards each other and thus ensure untwisting of the inner conductors 30, 31 and arrangement of the inner conductors 30, 31 in one plane.

The plane runs between the two rollers 60, 62 and parallel to the axes of rotation of the rollers 60, 62. In the drawings, the plane in which the inner conductors 30, 31 are to be or will be arranged before the insulation of the inner conductors 30, 31 is cut and removed runs in each case horizontal.

The stripping device 5 is also referred to as cut & strip device.

Finally, it should be noted that terms such as "having", "comprising", etc. do not exclude other elements or steps and terms such as "a" or "an" do not exclude a plurality. Furthermore, it should be noted that features or steps described with reference to one of the above exemplary embodiments can also be used in combination with other features or steps of other exemplary embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

REFERENCE LIST

5 Stripping device
7 Moving device
10 Cables
12 First section
14 Second section
20 Cable sheath
30 Inner conductor
31 Inner conductor
35 Strands
36 Strands
38 Insulation
40 Cutter head
42 Stripping blade
44 Stripping blade
46 Cutting blade
48 Cutting blade
50 Compression spring
52 Compression spring
60 First roller
62 Second roller
64 Pneumatic actuator

What is claimed is:

1. A method for removing insulation from a plurality of inner conductors inside a sheath of a cable comprising the steps of:
   providing a stripping device having stripping blades and first and second rollers, each of the first and second rollers being rotatable about a respective axis and being movable towards and away from each other;
   providing the cable with a first section in which the cable sheath is removed and a second section in which the cable sheath is not removed;
   inserting the first section between the first and second rollers;
   moving at least one of the first roller and the second roller such that the first and second rollers clamp the first section between the first and second rollers;
   moving the cable in a first direction such that the second section moves away from the first and second rollers while the first section is clamped between the first and second rollers;
   moving the cable in a second direction opposite the first direction such that the second section moves toward the first and second rollers while the first section is clamped between the first and second rollers;
   moving the stripping blades towards the first section such that the stripping blades cut into the insulation of the inner conductors; and
   moving the cable in the first direction to remove at least part of the insulation from the inner conductors.

2. The method according to claim 1 wherein a pressure with which the first and second rollers clamp the first section is increased after the cable has been moved in the first direction and before the cable is moved in the second direction.

3. The method according to claim 1 wherein the stripping blades and cutting blades for cutting the cable are included on a cutter head, and including a step of moving the cutter head in a direction perpendicular to the first direction to arrange the first section between the stripping blades.

4. The method according to claim 1 wherein during the clamping of the first portion between the first and second rollers, the first and second rollers are each moved toward one another.

5. The method according to claim 1 wherein a pressure with which the first and second rollers clamp the first section is a function of a distance between the first and second rollers.

6. The method according to claim 1 wherein a pressure with which the first and second rollers clamp the first section is pneumatically adjusted independently of a distance between the first and second rollers.

7. The method according to claim 1 including moving the cable multiple times alternately in the first direction and the second direction while the first section is clamped between the first and second rollers.

8. The method according to claim 1 including moving the cable alternately in the first direction and the second direction until the inner conductors are arranged in one plane.

9. A stripping device for removing insulation from inner conductors inside a sheath of a cable having a first section in which the cable sheath is removed and a second section in which the cable sheath is not removed, the stripping device comprising:
   a rotatable first roller and a rotatable second roller adapted to clamp the first section of the cable between the first roller and the second roller;

a moving device for moving the cable in a first direction and then in a second direction opposite to the first direction while the first section is clamped between the first and second rollers;

wherein during movement of the cable in the first direction, the second section is moved away from the first and second rollers and during movement of the cable in the second direction, the second section is moved toward the first and second rollers; and stripping blades for removing the insulation of the inner conductors, wherein the stripping blades are arranged to cut into the insulation of the inner conductors whereby the insulation is removed from the inner conductors when the cable is moved in the first direction.

10. The stripping device according to claim 9 including a cutter head having the stripping blades and cutting blades thereon, wherein the cutter head is movable in a direction perpendicular to the first direction such that the first section extends between the stripping blades.

11. The stripping device according to claim 9 wherein the first and second rollers are movable towards one another in opposite directions of movement to clamp the first section.

12. The stripping device according to claim 9 wherein a pressure with which the first and second rollers clamp the first section can be increased while the first section is clamped between the first and seconds rollers by moving at least one of the first and second rollers, wherein the pressure with which the first and second rollers clamp the first section is a function of a distance between the first and second rollers.

13. The stripping device according to claim 9 wherein a pressure with which the first and second rollers clamp the first section can be increased by an actuator coupled to at least one of the first and second rollers without substantially changing a distance between the first and second rollers while the first section is clamped between the first and second rollers.

14. The stripping device according to claim 9 wherein the moving device is adapted to move the cable multiple times alternately in the first direction and the second direction while the first section is clamped between the first and second rollers.

15. The stripping device according to claim 9 wherein the moving device is adapted to move the cable alternately in the first direction and the second direction until the inner conductors are arranged in one plane.

\* \* \* \* \*